(12) United States Patent
Xu

(10) Patent No.: US 7,535,193 B2
(45) Date of Patent: May 19, 2009

(54) FIVE AXIS COMPENSATED ROTATING STAGE

(75) Inventor: Ying Xu, San Ramon, CA (US)

(73) Assignee: Xradia, Inc., Concord, CA (US)

( * ) Notice: Subject to any disclaimer, the term of this patent is extended or adjusted under 35 U.S.C. 154(b) by 216 days.

(21) Appl. No.: 11/764,486

(22) Filed: Jun. 18, 2007

(65) Prior Publication Data

US 2008/0309276 A1 Dec. 18, 2008

(51) Int. Cl.
*B64C 17/06* (2006.01)
(52) U.S. Cl. .................. 318/649; 318/648; 318/652; 318/135; 310/311
(58) Field of Classification Search ................ 318/135, 318/560, 625, 638, 648, 649, 652, 687; 310/311
See application file for complete search history.

(56) References Cited

U.S. PATENT DOCUMENTS

| | | | | |
|---|---|---|---|---|
| 5,744,924 A | * | 4/1998 | Lee | 318/568.17 |
| 5,780,943 A | * | 7/1998 | Ono | 310/12 |
| 5,982,128 A | * | 11/1999 | Lee | 318/568.16 |
| 6,049,186 A | * | 4/2000 | Lee | 318/611 |
| 6,104,776 A | | 8/2000 | Oikawa | |
| 6,271,640 B1 | * | 8/2001 | Lee | 318/560 |
| 6,281,654 B1 | * | 8/2001 | Lee | 318/649 |
| 6,538,348 B2 | * | 3/2003 | Sawai et al. | 310/12 |
| 6,744,228 B1 | * | 6/2004 | Cahill et al. | 318/135 |
| 6,949,844 B2 | * | 9/2005 | Cahill et al. | 310/12 |
| 6,992,407 B2 | * | 1/2006 | Kano et al. | 310/10 |
| 6,995,499 B2 | * | 2/2006 | Hwang | 310/328 |
| 7,099,432 B2 | | 8/2006 | Ichihara et al. | |
| 7,215,736 B1 | | 5/2007 | Wang et al. | |
| 2003/0068010 A1 | | 4/2003 | Lentfer | |

* cited by examiner

*Primary Examiner*—Bentsu Ro
*Assistant Examiner*—Thai Dinh
(74) *Attorney, Agent, or Firm*—Houston Eliseeva LLP

(57) ABSTRACT

A rotating stage assembly performs high precision rotational angle and position error correction by continuous sensing and correcting motor stage assembly errors. It performs these corrections, to adjust for motor environmental and operational errors by sensing and correcting using five sensors placed to measure the adjustments of five corresponding actuators, which adjust the entire motor rotating stage and rotary motor assembly relative to a reference frame.

15 Claims, 5 Drawing Sheets

FIVE AXIS COMPENSATED ROTATING STAGE

BACKGROUND OF THE INVENTION

The need for accurate movement is evident in all aspects of the miniaturization of electronics, from nanometer precision x-y stage movement in semiconductor lithography to accurate linear motion with regard to rotating media in optical and magnetic disk arms, but these do not need to deal with three dimensional correction of rotating stages.

One application that requires high three dimensional positional precision when rotating an object is three dimensional (3D) x-ray imaging with computed tomography (CT), where the rotation axis must be known accurately in three dimensions with precision well below the imaging resolution. At least one such x-ray inspection tool, as described in U.S. Pat. No. 7,215,736, granted May 8, 2007, requires the rotation of a sample to be accurate to within tens of nanometers in all three dimensions. This allows a sample to be rotated in the x-ray beam thereby enabling tomographic data acquisition by accurately generating multiple projections of the sample for later tomographic reconstruction possibly without additional alignment procedures.

Such precision is difficult to achieve in rotating stages due to random errors from bearings and spindle wobble and play, as well as manufacturing variations in the motor housing and the dimension and smoothness of the stage assembly attached to the motor. Furthermore, no matter how accurate the components can be made, some portion or all of it must be constructed out of normal engineering materials, which in general have significant thermal expansion characteristics.

SUMMARY OF THE INVENTION

This invention pertains to a rotating stage assembly, which can be used to perform high precision position error correction by continuously sensing and correcting motor stage assembly errors. It performs these corrections, to adjust for motor environmental and operational errors by sensing and correcting using five sensors, in one embodiment, placed to measure the adjustments of five corresponding actuators, which adjust the entire motor rotating stage and rotary motor assembly relative to a reference frame, maintaining the position accuracy of the rotation axis of the stage.

In general, according to one aspect, the invention features five axis correction of the whole rotating motor and stage assembly using five piezo actuators; one for translation in x, one for translation in y and three for both translational and angular motion of the z corrections, with five corresponding capacitive sensors for measuring the corrected positions.

In the present embodiment, actuators adjust the position of a rotation stage relative to a reference frame. The rotation stage houses a motor for rotating a metrology disk, the center of which contains a sample stage, where a sample is placed. The metrology disk is made of a material with low or well-characterized thermal expansion characteristics. The disk is preferably uniformly coated with a conductive material allowing the sensors, such as capacitive sensors for example, which are mounted to the reference frame. These sensors correspond to five actuators mounted on an actuator stage, which is also attached to the reference frame, to measure the position and angle of the metrology disk and thus the corresponding sample stage.

In a preferred embodiment, control logic measures the sensors and adjusts the actuators on a continuous basis, taking into account the current rotational angle (wobble) of the metrology disk relative to the reference frame, and adjusting accordingly for all anomalies due to the motor's mechanical tolerances, and temperature variations.

In another embodiment a sixth reference sensor may be used to collect the form errors of the circular metrology disk during normal rotation. The reference measurements along with other residual error measurements of all angular rotations of the metrology disk may be taken and used to pre-compute form corrections for each rotation angle of the metrology disk, which when stored in a form corrections data file, may read back and applied at each angle the disk is subsequently moved to during normal operation.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Many other products utilize high precision linear motion control, but rotary motion control is less straight forward.

Figure 1:
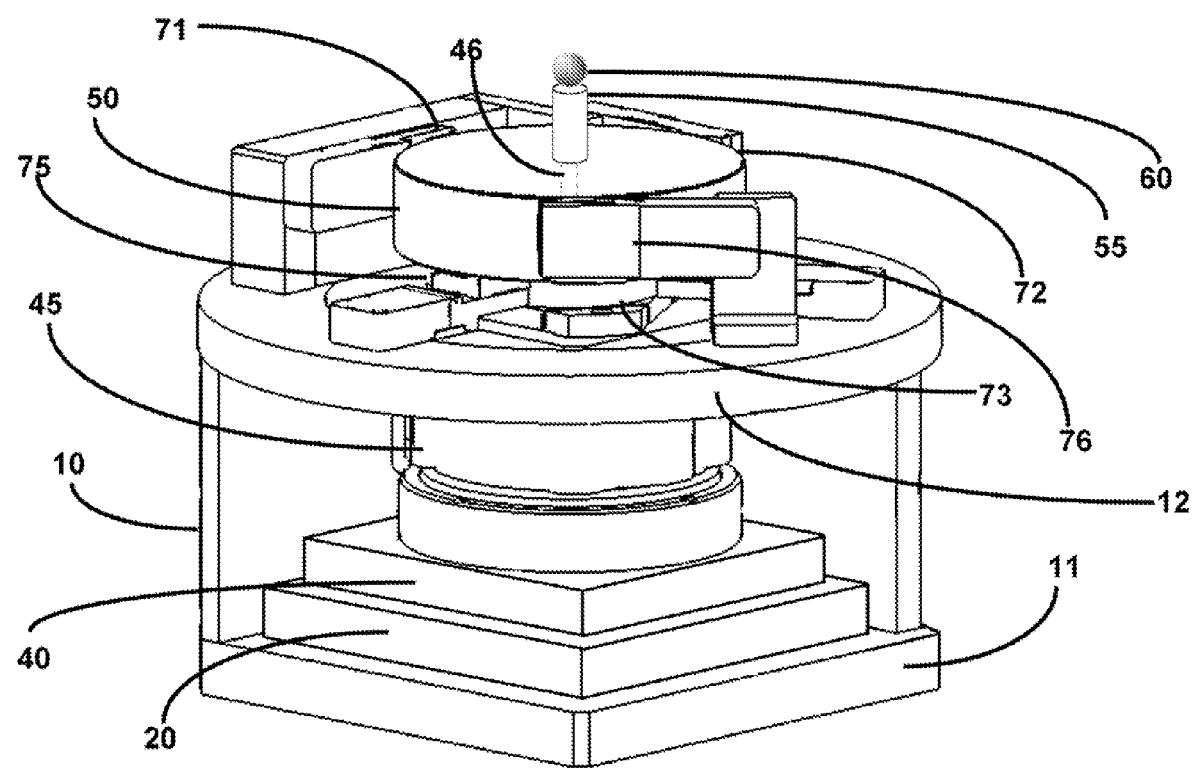
FIG. 1 is a schematic perspective view of the rotating stage assembly according to the present invention.

FIG. 1 shows a projection of the five axis compensated rotary stage assembly 10 comprised of a reference frame 11, with an actuator stage 20 attached to it, a rotation stage 40 containing a rotary motor 45, whose shaft is connected to a metrology disk 50. A sample 60, to be rotated, is placed upon the sample platform 55, attached to the center of the metrology disk 50. The rotary motor rotates the metrology disk 50, the sample platform 55 and the sample 60, relative to the reference frame 11. The actuator stage 20 contains five actuators to adjust the placement of the rotation stage 40 in five axes. The spindle shaft 46 of the rotary motor 45 extends through a hole in the top plate 12 of the reference frame 11. Six sensors 71, 72, 73, 75, and 76 (74 not shown) are mounted on fixed mechanical arms, which are attached to the top plate 12 of the reference frame 11 to position the sensors near the side and bottom of the metrology disk 50. This allows five axis measurements between the metrology disk and the platform, which can then be corrected by the actuators. The reference frame, sensor arms, sample platform and metrology disk are made out of low thermal expansion materials to minimize errors due to thermal expansion. The metrology disk 50 is centered above the reference frame 11 and the sensor arms are made of the same material as the reference frame to minimize uncorrectable horizontal errors due to thermal expansion. In this fashion the sensors can detect all other variations between the sample 60 and the reference frame 11.

In one embodiment, the reference frame 11 and sensor arms are constructed out of Invar, while the metrology disk is constructed out of Zerodur. While both materials have very low coefficients of thermal expansion, Zerodur, which is used in reflector telescope construction, is better suited for extremely accurate polishing and reflective coatings, which are required in the construction of the metrology disk, to get the flatness of end surface down to <10 nanometers.

Figure 2:
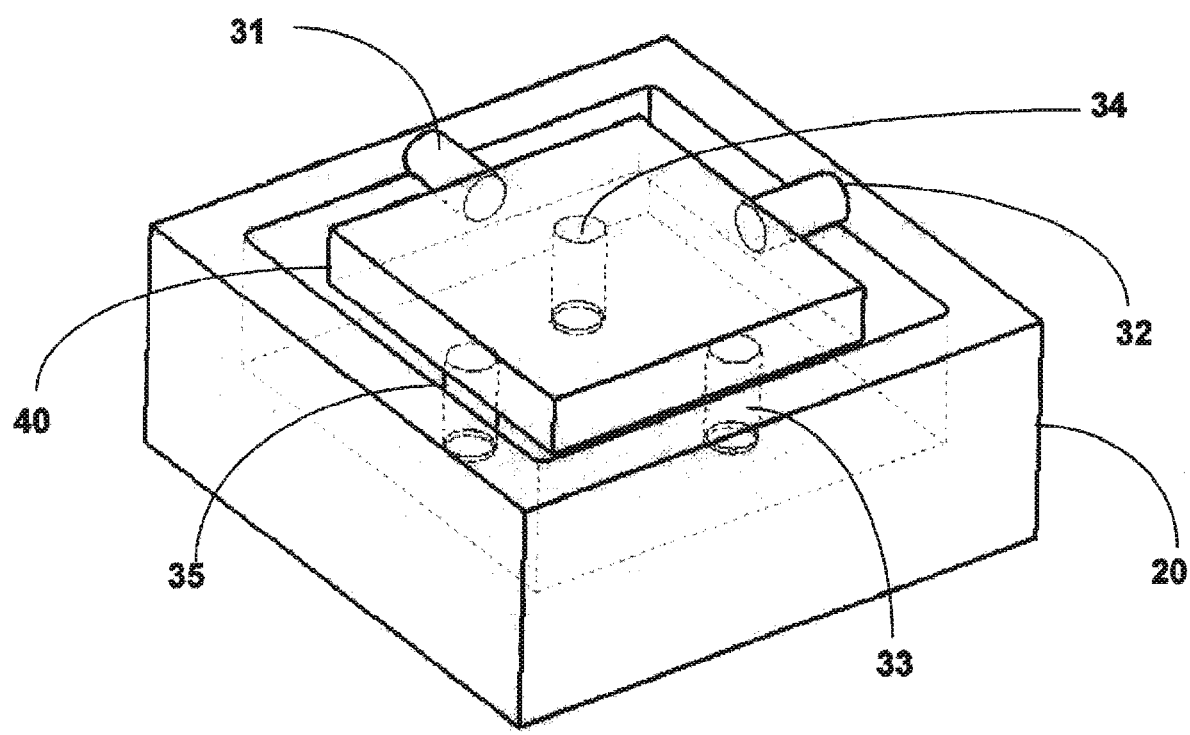
FIG. 2 is a simplified schematic view showing the placement of the actuators within the actuator stage.

FIG. 2 shows a schematic of the placement of actuators used to compensate for errors during rotation of the sample 60. There are five actuators 31, 32, 33, 34 and 35, which adjust the position of the rotation stage 40, relative to the actuator stage 20. Two actuators 31 and 32, adjust the lateral position of the rotation stage 40 in planes mostly perpendicular to the axis of rotation of the metrology disk 50. The other three actuators 33, 34 and 35, extend between the reference frame 11 and the rotation stage to adjust the tilt angle of the rotation stage 40. The three actuators 33, 34, 35, are placed preferably equidistant from the center axis of the metrology disk projected onto the rotation stage and located at 120 degree angles from each other about the center axis of rotation of the motor's spindle shaft. Together these three actuators 33, 34 and 35 correct for small angular variations of the metrology disk's axis of rotation off of the plane defined by the top plate 12 of the reference frame. Each of the actuators, their housings and their placement between the actuator stage and the rotation stage are designed to minimize crosstalk between the other actuators during correction.

Figure 3:
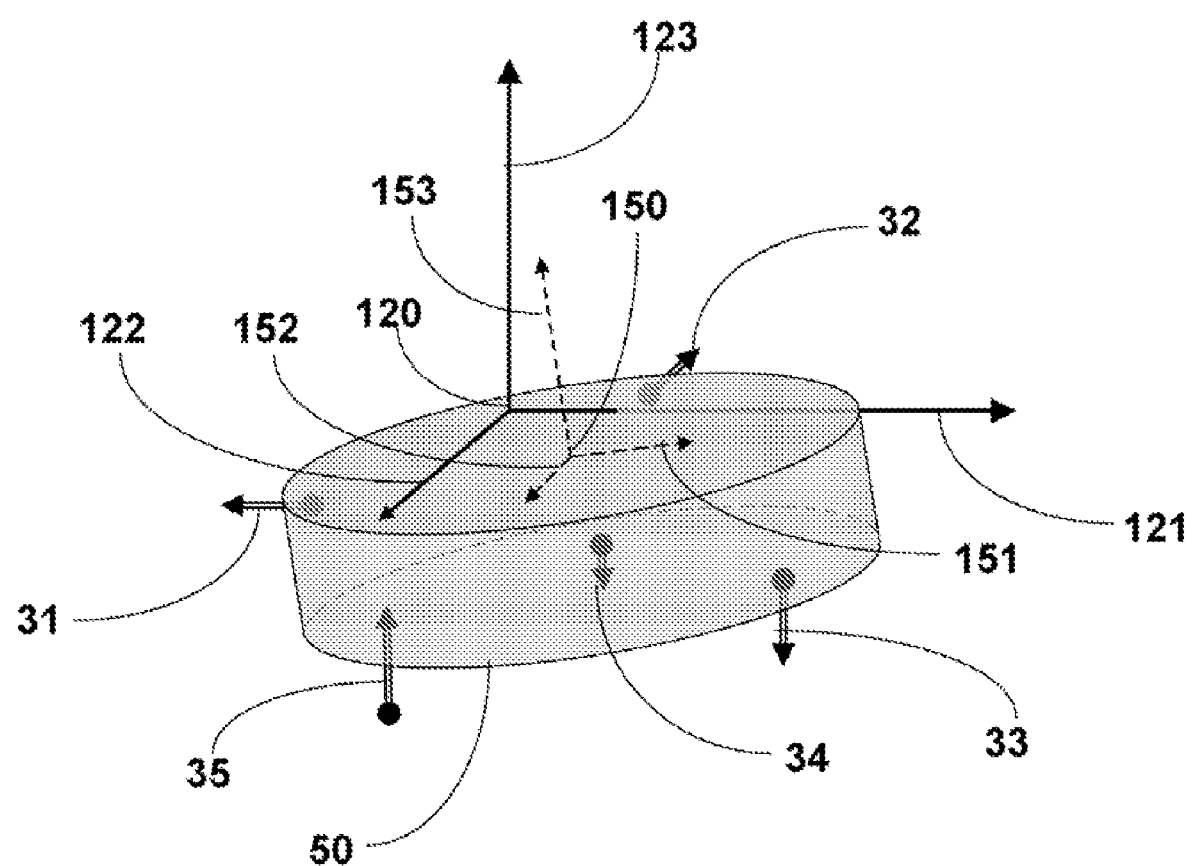
FIG. 3 is a diagram of an unaligned metrology disk with its coordinate system and the coordinate system of the reference stage.

For example, FIG. 3 shows the metrology disk 50 displaced and tilted at an angle with respect to a coordinate system related to the top plate 12 of the reference frame (not shown), consisting of X 121, Y 122, and Z 123 axes. A coordinate system of the metrology disk also contains X 151, Y 152, and Z 153 axes. To align the metrology disk to the coordinate system of the reference frame, the origins 120 and 150 of the two coordinate systems must be aligned by adjusting actuators 31 and 32 to move the metrology disk in the direction of their arrows, and the Z 121, 151 axes must be aligned by aligning the plane determined by the X 121 and Y 122 axes to the plane of the metrology disk 50 determined by the X 151 and Y 152 axes. This is done by adjusting the actuators 33, 34, and 35 to move the metrology disk in the direction of their arrows.

Figure 4:
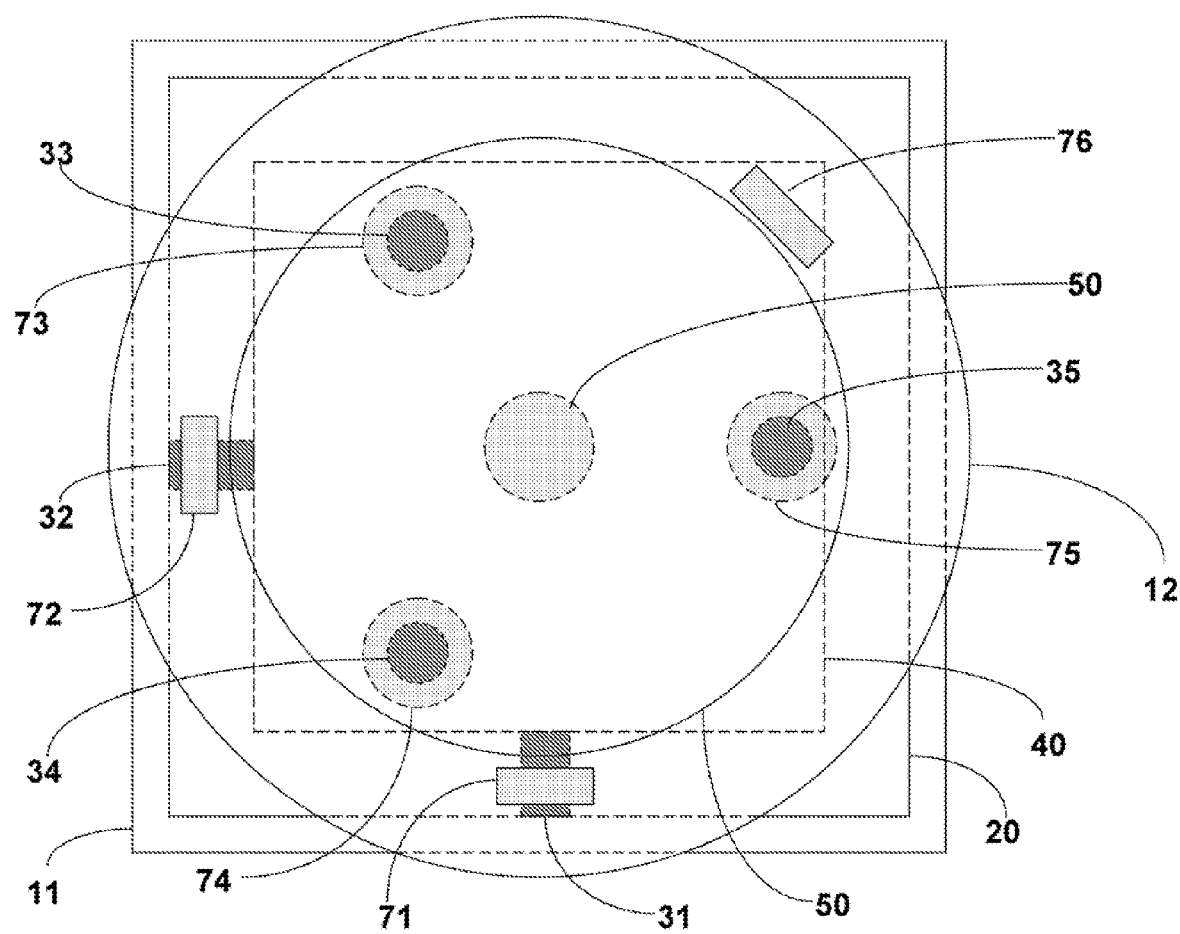
FIG. 4 is a simplified schematic of a vertical view of the rotating stage assembly showing the placement of actuators and sensors.

FIG. 4 is a schematic top view of the sensor and actuator placement within the rotary stage assembly. The two sensors 71 and 72 are placed to measure perpendicular distances to the edge of the metrology disk on the plane perpendicular to the metrology disk's axis of rotation. They correspond to the two actuators 31 and 32, which adjust the rotation stage in a plane parallel to the plane of the two sensors 71 and 72. The three sensors 73, 74 and 75 are between the flat surfaces of the top plate 12 and the metrology disk 50, and all measure the distance between the top plate 12 and the metrology disk 50 in a direction parallel to the disk's axis of rotation. Each actuator is paired with a sensor. All five actuators 31, 32, 33, 34 and 35 are placed equidistant from their corresponding sensors 71, 72, 73, 74, and 75 on axes parallel to the disk's axis of rotation, and all five sensors 71, 72, 73, 74, and 75 sense distances to the metrology disk, in directions which are parallel to their corresponding actuators 31, 32, 33, 34 and 35. This placement minimizes the calculations necessary to correct for errors, particularly in vertical direction and tip-tilt due to variations induced by the rotation stage, motor, spindle and assembly to the metrology disk.

For very high precision rotational placement, the actuators are piezo-electric devices with minimum adjustment in the nanometers but full travel is limited to hundreds of micrometers. Actuators based on other technologies such as voice coils, linear motors, or electrostatic actuators are used in other embodiments.

The metrology disk has a thin metallic coating, of preferably gold, and the sensors sense capacitance. The capacitive sensors are of sufficient size to average the surface variations of the metallic coating and still have the same level of sensitivity as the actuators. Other equally position sensitive, fine variation insensitive sensor technologies such as large spot laser interferometers or grating-based optical sensors are used in other examples.

Alternatively, to get larger error correction with less precision, other less accurate actuators such as lead screw assemblies may be used along with less precise sensors, such as ultrasound, which can handle correspondingly larger ranges of error correction.

Figure 5:
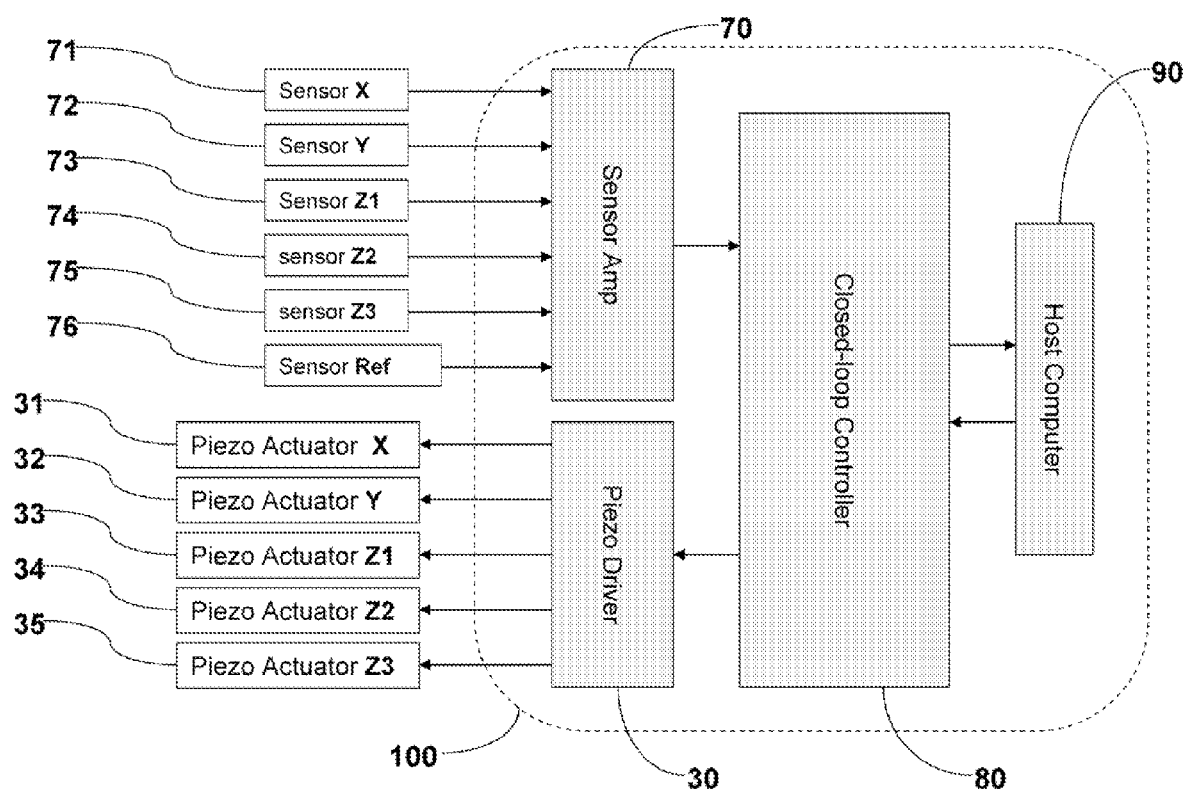
FIG. 5 is a schematic of the connections between the host computer, the sensors and the actuators of the rotary disk assembly.

FIG. 5 is a schematic of the control electronics 100, which controls the correction of the rotation stage to compensate for the variations in spindle wobble, thermal expansion and bearing errors in the motor and its housing. The control electronics 100 has sensor amplifiers 70 to read signals from the six sensors 71 through 76, drivers 30 to control the five actuators 31 through 35, both of which are continuously controlled by the controller 80, which repeatedly reads the sensors and adjusts the actuators, and a computer 90, which controls the rotary motor, rotating the metrology disk, provides a set of preprocessed offsets to the controller, and receives the final adjusted position error measurements from the controller.

The corresponding placement of the sensor actuator pairs, along with the design of the actuators which minimizes cross talk between actuators, generally minimizes the calculations needed to correct the position errors. The result of each sensor is primarily just fed back to its actuator, with at most small corrections due to the other sensor measurements. The independent nature of these corrections simplifies the controller and minimizes the time needed to do the position corrections.

If the metrology disk had a perfectly circular edge there would be no need for the reference sensor 76, since the X sensor 71 and the Y sensor 72 would detect the placement error of the metrology disk in the plane perpendicular to its axis of rotation, but while flat surfaces such as are constructed on the top and bottom of the metrology disk may be polished flat within 10 nanometers, it is not currently possible to achieve that level of precision for the curvature of the disk. As a result, measurements from the reference sensor 76, which are previously collected after corrections using the other five sensors, may later be used to correct for the disk's edge distortions (form errors).

In one embodiment, a disk calibration procedure is performed to generate a form corrections data file, containing the disk's form corrections for each rotation angle of the metrology disk. During this disk calibration, at each rotation angle of the metrology disk, the actuators 31, 32, 33, 34, and 35, and sensors 71, 72, 73, 74, and 75, are in closed loop correction through controller 80, and following the correction, the output of the reference sensor 76 stored in the computer 90 in a look up table (LUT) or algorithmically. By applying the closed loop correction prior to obtaining the output of the reference sensor, the effects of all other errors except the form error of the disk are eliminated from the reference sensor measurement The form corrections may then be calculated from the stored measurements of the reference sensor according to the geometry relationship between the sensor 71, 72 and 76, and outputted along with the rotation angle to the form corrections data file. Later, during normal operation, the form corrections for the current rotation angle of the metrology disk may be read from the form corrections data file and added to the closed loop correction of actuators 31 and 32 to correct the disk's form errors, thereby simplifying the control logic in the controller 80 and eliminating the need to use the reference sensor 76 during normal operation.

In this fashion, all positional errors of the metrology disk, relative to the reference frame, may be corrected for any rotation of the sample stage and sample. Corrections to center the sample stage or sample on the axis of rotation of the metrology disk, may be done prior or during the gathering of tomography data by the x-ray imaging equipment.

It is further contemplated that the high precision positional correction capability of this rotary stage assembly may be used along with a high precision external measuring device to accurately measure the circular characteristics of a sample, regardless of centering, providing the sample is within the range of the external sensing device throughout the measured rotation.

It is also contemplated that metrology disks and top plates of reference frames without high precision flat surfaces may be used by creating a planarity corrections data file prior to creating the form corrections data file. The planarity corrections data is gathered by first aligning a reference sample to external measurement equipment, and then for each rotation angle, outputting sensors 73, 74 and 75, along with an external measurement of the reference sample after zeroing actuators 33, 34, and 35, and only running sensors 31 and 32 with actuators 71 and 72 in closed loop correction through the computer 80. Then in a fashion similar to the creation of the form correction data file, the external measurements and the output from sensors 73, 74 and 75 may be used to create a planarity corrections data file, which may then be used in the calibration process to create the form corrections data file, by initializing the actuators before each closed loop correction. Thereafter, during normal operation, the reference sensor and external measurement equipment is not needed, and again in a manner similar to the use of the form corrections data, the planarity corrections for the current rotation angle of the disk are read from the planarity corrections data file and added to the closed loop correction of actuators 33, 34 and 35 to correct the disk's planarity errors, along with reading the form corrections data file and adding the form corrections to the closed loop correction of actuators 31, and 32 to correct the disk's form errors, thereby simplifying both the creation of the mechanical and electrical subsystems.

While this invention has been particularly shown and described with references to preferred embodiments thereof, it will be understood by those skilled in the art that various changes in form and details may be made therein without departing from the scope of the invention encompassed by the appended claims.

What is claimed is:

1. A rotating stage assembly comprising;
   a reference frame,
   a rotation stage;
   a motor attached to the rotation stage and including a rotating spindle;
   a metrology disk connected to the rotating spindle;
   at least one sensor for detecting the position of the metrology disk relative to the reference frame;
   a sample stage connected to the rotating spindle for holding a sample;
   multiple actuators connected to the reference frame and positioning the rotation stage relative to the reference frame; and
   a controller for driving the multiple actuators in response to the sensors to control the position of the sample during the rotation of the sample by the motor.

2. A rotating stage assembly as in claim 1, wherein the controller drives the actuators to continuously correct for errors to ensure that the sample rotates around a constant axis with reduced translational and/or rotational error.

3. A rotating stage assembly as in claim 1, wherein a first actuator adjusts the rotation stage in one dimension parallel to the plane of the disk, a second actuator adjusts the rotation stage in one dimension parallel to the plane of the disk and perpendicular to the adjustment if the first actuator, and a third, fourth and fifth actuator adjust the rotation stage in the axis parallel to the spindle.

4. A rotating stage assembly as in claim 3, wherein the third, fourth and fifth actuators are placed at points from the axis of the spindle with 120 degrees of angular separation from each other.

5. A rotating stage assembly as in claim 4, wherein the five actuators are piezo-actuators.

6. A rotating stage assembly as in claim 4, further comprising five sensors, wherein each of the sensors are placed between the metrology disk and the reference frame equidistant from one of the actuators parallel to the axis of the spindle.

7. A rotating stage assembly as in claim 6, wherein each of the sensors senses the distance of the metrology disk from the sensor in the same axis as one of the actuators adjusts the rotation stage to the reference frame.

8. A rotating stage assembly as in claim 6, wherein the metrology disk surface is covered with a metallic material, the five sensors sense capacitance.

9. A rotating stage assembly as in claim 6, further comprising a reference sensor; wherein the reference sensor is place between the frame and the edge of the metrology disk equidistant from two of the five sensors which also sense the edge of the metrology disk.

10. A rotating stage assembly as in claim 1, wherein the reference frame, the metrology disk and the sample stage are constructed using low thermal expansion materials to minimize errors due to temperature.

11. A rotating stage assembly as in claim 1, further comprising five sensors, a reference sensor and five actuator drivers, five sensor receivers, a reference sensor receiver, controller logic and a computer; wherein the controller logic continuously reads the five sensors through the sensor receivers and drives the corresponding actuators through the actuator drivers to adjust the rotation stage to center the sample stage.

12. A rotating stage assembly as in claim 11, wherein the computer continuously controls the motor rotation of the metrology stage, drives the control logic with predefined offsets for the angle of the metrology stage and reads the results of the controller adjustments.

13. A rotating stage assembly as in claim 1, wherein a first actuator adjusts the rotation stage in one dimension parallel to the plane of the disk, a second actuator adjusts the rotation stage in one dimension parallel to the plane of the disk and perpendicular to the adjustment if the first actuator, and a third and fourth actuator adjust an angle of rotation of the rotation stage in a direction perpendicular to the plane of the disk.

14. A method for rotating and correcting position errors of a rotating sample stage assembly comprising: a metrology disk, a reference frame, actuators, which adjust a motor that rotates the sample and the metrology disk, and sensors that measure spacing between the reference frame and the metrology disk, the method comprising;
   rotating the metrology disk,
   reading form corrections for an angle of the metrology disk from a form corrections data file;
   applying the form corrections to the actuators; and
   reading sensors and adjusting the actuators.

15. A method for creating a form corrections data file to correct form errors of a rotating metrology disk in a rotating stage assembly comprising: a reference frame; actuators, which adjust a motor that rotates the metrology disk; and sensors that measure spacing between the reference frame and the metrology disk, the method comprising:
   rotating the metrology disk;
   reading the sensors and adjusting the actuators until position and angle errors of the metrology disk relative to the reference frame are minimized;
   reading a measurement from a reference sensor;
   calculating form corrections for the angle of the metrology disk, and writing the form corrections and rotation angle to a form corrections data file.

* * * * *